(12) United States Patent
Xu et al.

(10) Patent No.: US 9,804,282 B2
(45) Date of Patent: Oct. 31, 2017

(54) COMPUTER-ASSISTED FAULT INTERPRETATION OF SEISMIC DATA

(71) Applicants: GENERAL ELECTRIC COMPANY, Schenectady, NY (US); EXXONMOBIL UPSTREAM RESEARCH COMPANY, Houston, TX (US)

(72) Inventors: Yi Xu, Niskayuna, NY (US); Frederick Wilson Wheeler, Niskayuna, NY (US); Ali Can, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 506 days.

(21) Appl. No.: 14/182,157

(22) Filed: Feb. 17, 2014

(65) Prior Publication Data
US 2015/0234070 A1 Aug. 20, 2015

(51) Int. Cl.
G01V 1/28 (2006.01)
G01V 1/34 (2006.01)
G01V 1/30 (2006.01)

(52) U.S. Cl.
CPC .............. *G01V 1/345* (2013.01); *G01V 1/301* (2013.01); *G01V 2210/642* (2013.01)

(58) Field of Classification Search
CPC ... G01V 1/345; G01V 1/301; G01V 2210/642
USPC .......................................................... 702/16
See application file for complete search history.

(56) References Cited

U.S. PATENT DOCUMENTS

| | | | |
|---|---|---|---|
| 4,916,615 | A | 4/1990 | Chittineni |
| 4,992,995 | A | 2/1991 | Favret |
| 5,047,991 | A | 9/1991 | Hsu |
| 5,189,643 | A | 2/1993 | Wang et al. |
| 5,265,192 | A | 11/1993 | McCormack |
| 5,274,714 | A | 12/1993 | Hutcheson et al. |
| 5,416,750 | A | 5/1995 | Doyen et al. |
| 5,444,619 | A | 8/1995 | Hoskins et al. |
| 5,465,308 | A | 11/1995 | Hutcheson et al. |

(Continued)

FOREIGN PATENT DOCUMENTS

| | | |
|---|---|---|
| JP | 2001084462 | 3/2001 |
| JP | 2003293257 | 10/2003 |

(Continued)

OTHER PUBLICATIONS

Gibson et al, "Fault Surface Detection in 3-D Seismic Data", Sep. 2005, IEEE Transactions on Geoscience and Remote Sensing, vol. 43 No. 9, p. 2094-2102.*

(Continued)

*Primary Examiner* — Stephanie Bloss
(74) *Attorney, Agent, or Firm* — Fletcher Yoder, P.C.

(57) ABSTRACT

The approaches presently disclosed provide for fault-interpretation in a seismic volume with computer assistance, allowing automatic or semi-automatic determination of a fault surface and associated displacement across the fault. The present fault interpretation approach uses pattern matching algorithms and does not require prior interpretation of the stratigraphic horizons. In certain implementations the fault interpretation approach estimates the 3D fault surface as part of a joint fault surface location and displacement optimization process.

20 Claims, 12 Drawing Sheets

(56) References Cited

U.S. PATENT DOCUMENTS

| | | |
|---|---|---|
| 5,539,704 A | 7/1996 | Doyen et al. |
| 5,586,082 A | 12/1996 | Anderson et al. |
| 5,677,893 A | 10/1997 | de Hoop et al. |
| 5,852,588 A | 12/1998 | de Hoop et al. |
| 5,930,730 A | 7/1999 | Marfurt et al. |
| 5,940,777 A | 8/1999 | Keskes |
| 6,018,498 A | 1/2000 | Neff et al. |
| 6,052,650 A | 4/2000 | Assa et al. |
| 6,092,026 A | 7/2000 | Bahorich et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Oayia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1* | 2/2006 | Acosta .............. G06T 15/08 345/419 |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,203,342 B2 | 4/2007 | Pedersen |
| 7,206,782 B1 | 4/2007 | Padgett |
| 7,222,023 B2 | 5/2007 | Laurent et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,283,911 B2 | 10/2007 | Fitzsimmons et al. |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,330,791 B2 | 2/2008 | Kim et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,554,883 B2 | 6/2009 | Barnes |
| 7,596,056 B2 | 9/2009 | Keskes et al. |
| 7,697,373 B1 | 4/2010 | Padgett |
| 7,751,278 B2 | 7/2010 | Barnes |
| 7,796,469 B2 | 9/2010 | Keskes et al. |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,792 B2 | 2/2012 | Hsu et al. |
| 8,121,969 B2 | 2/2012 | Chan et al. |
| 8,219,322 B2 | 7/2012 | Monsen et al. |
| 8,326,542 B2 | 12/2012 | Chevion et al. |
| 8,346,695 B2 | 1/2013 | Pepper et al. |
| 8,358,561 B2 | 1/2013 | Kelly et al. |
| 8,363,959 B2 | 1/2013 | Boiman et al. |
| 8,364,442 B2 | 1/2013 | Skripkin |
| 8,385,603 B2 | 2/2013 | Beucher et al. |
| 8,447,525 B2 | 5/2013 | Pepper et al. |
| 8,515,678 B2 | 8/2013 | Pepper et al. |
| 2003/0112704 A1* | 6/2003 | Goff ................ G01V 1/30 367/72 |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop et al. |
| 2006/0122780 A1 | 6/2006 | Cohen et al. |
| 2006/0184488 A1 | 8/2006 | Wentland |
| 2008/0123469 A1 | 5/2008 | Wibaux et al. |
| 2008/0185478 A1 | 8/2008 | Dannenberg |
| 2008/0270033 A1 | 10/2008 | Wiley et al. |
| 2009/0192717 A1 | 7/2009 | Iversen et al. |
| 2010/0174489 A1 | 7/2010 | Bryant et al. |
| 2010/0211363 A1 | 8/2010 | Dorn et al. |
| 2010/0245347 A1* | 9/2010 | Dorn ................ G01V 1/30 345/419 |
| 2011/0118985 A1 | 5/2011 | Aarre |
| 2011/0307178 A1 | 12/2011 | Hoekstra |
| 2012/0037379 A1* | 2/2012 | Hilliard ............ G06T 17/05 166/369 |
| 2012/0072116 A1 | 3/2012 | Dorn et al. |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0112407 A1* | 5/2013 | Cheng .............. G01V 11/00 166/250.15 |
| 2013/0138350 A1 | 5/2013 | Thachaparambil et al. |
| 2013/0144571 A1 | 6/2013 | Pepper et al. |
| 2013/0151161 A1* | 6/2013 | Imhof ............... G01V 1/003 702/14 |
| 2013/0158877 A1 | 6/2013 | Bakke et al. |
| 2013/0229891 A1* | 9/2013 | Witte ............... G01V 1/34 367/9 |
| 2013/0262052 A1* | 10/2013 | Mallet .............. G01V 1/302 703/2 |
| 2014/0086011 A1* | 3/2014 | Brown .............. G01V 1/345 367/53 |

FOREIGN PATENT DOCUMENTS

| | | |
|---|---|---|
| JP | 2005244200 | 9/2005 |
| JP | 2012220500 | 11/2012 |
| WO | WO9713166 | 4/1997 |
| WO | WO9964896 | 12/1999 |
| WO | 2004038654 A2 | 5/2004 |

OTHER PUBLICATIONS

Maerten, Laurent, et al.; "How to Constrain 3-D Fault Continuity and Linkage Using Reflection Seismic Data: A Geomechanical Approach"; AAPG Bulletin, vol. 84, No. 9, Sep. 2000, pp. 1311-1324.

PCT/ISA/237; PCT/US2015/016056, Written Opinion, ISA/237, mailed Jul. 27, 2015; pp. 1-6.

Admasu, Fitsum et al.; "Automatic method for correlating horizons across faults in 3d seismic data;" Computer Vision and Pattern Recognition, 2004, CVPR 2004, Proceedings of the 2004 IEEE Computer Society Conference, vol. 1, 6 pages.

Admasu, Fitsum; "A stochastic method for automated matching of horizons across a fault in 3D seismic data;" Dissertation Otto-von-Guericke-Universitat Magdeburg, Universitatsbibliothek, 2008, 145 pages.

(56) References Cited

OTHER PUBLICATIONS

Aurnhammer, Melanie, et al.; "A genetic algorithm for automated horizon correlation across faults in seismic images;" Evolutionary Computation, IEEE Transactions on 9.2 (2005): 201-210.
Randen, T., et al.; Image Processing Tools for Geologic Unconformity Extraction; Norwegian Symposium in Signal Processing, Asker, Norway Sep. 9-11, 1999 (http://www.ux.uis.no/norsig/norsig99/), 1-5.
Hale, D.; "Fault surfaces and fault throws from 3D seismic images". SEG Technical Program Expanded Abstracts 2012: pp. 1-6. doi: 10.1190/segam2012-0734.1.
Gibson, David, et al.; "Automatic fault detection for 3d seismic data." In Proc. 7th Digital Image Computing: Techniques and Applications, pp. 821-830. 2003.

* cited by examiner

COMPUTER-ASSISTED FAULT INTERPRETATION OF SEISMIC DATA

BACKGROUND

The subject matter disclosed herein relates to the identification and analysis of geologic faults in seismic data.

Seismic data is collected and used for identifying and evaluating subsurface structures and layers within the earth. In practice, the seismic data is derived based on the propagation of seismic waves through the various geologic strata. In particular, the propagation of seismic waves may be useful in localizing the various edges and boundaries associated with different strata or layers within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and suitably processed to form a set of seismic data that may be used to examine the subsurface area being investigated.

Geologic faults may be observed within the various layers identified in a set of seismic data. Such faults are discontinuations of seismic horizons observed in the data. The fault data may be useful in searching for mineral resources, such as hydrocarbons. In particular, the faults can serve as trapping configurations for hydrocarbons and, thus, may indicate where concentrations of hydrocarbons can be found. One challenge that arises in the context of the analysis of fault data is that the stratigraphic surfaces on two sides of the fault may need to be matched to link seismic reflectors across the faults. This linkage may be useful in applications like well ties or stratigraphic interpretation. Further, in production contexts, analyzing hydrocarbon sealing and transmission mechanisms across the faults may be useful in reservoir management and drill planning.

Conventional approaches for fault interpretation and analysis, however, suffer from various inefficiencies and deficiencies and, in particular, may utilize significant levels of user involvement, and thus may be labor intensive. For example, existing fault interpretation of seismic data may rely heavily on having users interpret numerous 2D slices. Based on how horizons on each side match, an interpreter may make multiple hypotheses that have to be validated in the 3D volume set for a consistent interpretation. Since an inconsistent hypothesis may lead to discarding the interpretation, and starting over, existing manual interpretation approaches are inefficient.

BRIEF DESCRIPTION

In one embodiment, a seismic fault interpretation system is provided. In accordance with one embodiment, the seismic fault interpretation system includes a memory storing one or more routines and a processor that executes the one or more routines stored in the memory. The one or more routines, when executed by the processor, cause the processor to: obtain a seismic volume containing a fault, wherein the seismic volume comprises a plurality of slices; receive a subset of the plurality of slices; generate two or more control points associated with the fault for each slice of the subset of slices; based on the control points for each respective slice of the subset, determine a fault curve and associated displacements for the fault in each respective slice of the subset of slices; fit a 3D fault surface through the seismic volume based on the respective fault curves determined in the subset of slices; for each slice of the plurality of slices not included in the subset, determine a derived fault curve for each respective slice based on an intersection of the 3D fault surface with the slice; for each slice of the plurality of slices not included in the subset, determine a displacement that associates two sides of the derived fault curve determined for the respective slice; compute a 3D fault displacement map on the 3D fault surface; and output, to a display device, one or more images comprising the 3D fault surface and the 3D fault displacement map derived for the seismic volume.

In a further embodiment, a computer-assisted fault interpretation method for analyzing seismic data is provided. In accordance with an embodiment of this method, acts are performed including: receiving as an input a subset of slices taken from a larger set of slices defining a seismic volume; generating a plurality of control points for each slice of the subset of slices, wherein the plurality of control points describe a fault visible within the respective slice; based on the respective plurality of control points, determining a fault curve and respective displacements for the fault within each slice of the subset of slices; determining a 3D fault surface and a 3D displacement map based on the fault surface and respective displacements determined for each slice of the subset of slices; for each slice of the larger set of slices not included in the subset of slices, determining a respective fault curve and respective displacements for the fault based on the intersection of the 3D fault surface with the respective slice not included in the subset; for each slice of the plurality of slices not included in the subset, determining a displacement map that associates the two sides of the fault curve with respect to the respective slice; computing a 3D fault displacement map on the computed fault surface; and displaying at least the fault surface within the volume or on a respective slice through the volume.

In an additional embodiment, a non-transitory, computer-readable media, encoding one or more processor-executable routines is provided. The routines, when executed by a processor, causes acts to be performed comprising: receiving as an input a subset of slices taken from a larger set of slices defining a seismic volume; generating a plurality of control points for each slice of the subset of slices, wherein the plurality of control points describe a fault visible within the respective slice; based on the control points for each respective slice of the subset, determining a fault curve and associated displacements for the fault in each respective slice of the subset of slices; determining a 3D fault curve and a 3D displacement map based on the respective fault surfaces and displacements identified in the subset of slices; for each slice of the larger set of slices not included in the subset, determining a derived fault curve and associated displacements for the fault using the 3D fault curve and 3D displacement map; and displaying one or more images comprising fault information derived for the seismic volume.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
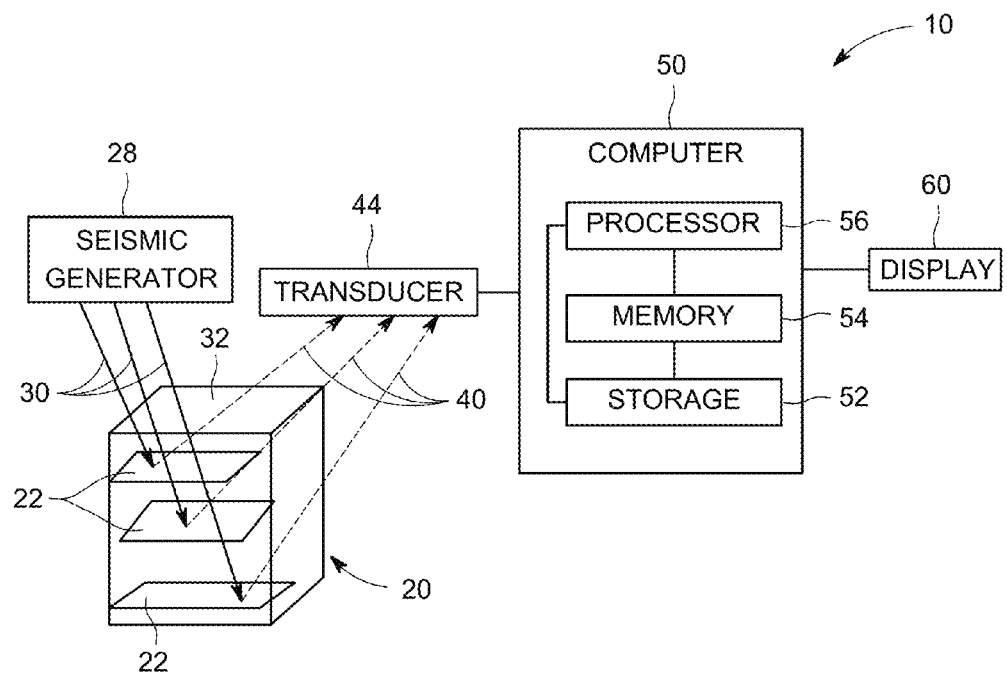
FIG. 1 depicts an example of a seismic data acquisition and analysis system, in accordance with aspects of the present disclosure.

Existing approaches to structural fault interpretation in seismic data may involve determining the fault surfaces and matching horizons across faults to determine a fault displacement map. Automated fault positioning and surface extraction in these conventional approaches are based on estimating the discontinuity of horizons on two-dimensional (2D) slices or by discontinuity enhancement, thinning, and surface extraction in three-dimensions. Fault surface extraction is frequently referred as "fault tracking" and is based on first calculating an attribute volume such as coherency or discontinuity, and then segmenting the low (in the context of coherency measurement) or high (in the context of discontinuity assessment) response regions in the attribute volumes. User-guided fault displacement algorithms typically assume that the fault surface is simple, such as a plane, and is already calculated using a fault tracking algorithm. Additionally, horizons on each side of the fault are typically delineated by an interpreter.

As discussed herein, the approaches presently disclosed provide for fault-interpretation in a seismic volume (i.e., a three-dimensional (3D) set of seismic data) with computer assistance, allowing automatic or semi-automatic determination of a fault surface and the displacements between horizon layers on both sides of a fault in 3D. Contrary to the existing approaches discussed above, the present fault interpretation approach directly operates on raw image data using pattern matching algorithms. That is, unlike conventional approaches, the present approach does not require that any of the stratigraphic horizons be interpreted prior to fault interpretation. For example, in certain implementations the present fault interpretation approach does not need the full 3D fault surface, and instead estimates the 3D fault surface as part of a joint optimization process, as discussed herein. Such a fault interpretation process may utilize an initialization based on manual selection of approximate fault locations via user inputs (i.e., hints) for a limited number of slices through a seismic volume. For example, performing manual interpretation on 1 out of 10 slices (e.g., 5% to 10% of the slices within a volume) may be sufficient to achieve satisfactory results. Further, for those slices that are manually interpreted to initialize the algorithm, such manual interpretation may involve a limited number of mouse clicks, sufficient to place two or more approximate fault surface points in the image.

By way of example, the present approach may be implemented on a processor-based system or systems as a front-end graphical user interface and a back-end fault interpretation engine. In such an implementation, the front end user interface may provide 3D visualization functionalities to enable geologists to quickly discover fault positions. The user interface may also provide geologists the functionalities, as discussed herein, to easily and efficiently interpret the fault locations on a small number of 2D cross sections, which may serve as an initialization for subsequent processing and fault interpretation. For example, based on these initial interpretations, the back-end fault interpretation engine may automatically refine the manually labeled fault locations by matching the two sides of the fault. Because only a limited number of slices are interpreted to initialize the algorithm, the work required of a reviewer may be greatly reduced.

In one embodiment, sparse 2D interpretation may then be automatically utilized in the 3D seismic volume to generate or extract a 3D fault surface and a 3D displacement map. In one embodiment, the algorithm estimates the displacements by computing the correlation between the horizons on the two sides of the fault. The interpretation results may then be passed back to the front end interface for visualization. Geologists can then validate the interpretation results, edit the results by deleting outliers, or optionally call for an additional iteration of the back end interpretation engine to further improve the results. As a result, the presently disclosed fault interpretation system can operate largely automatically, with limited input from the user. The labor and input required from users is minimal compared to conventional approaches. Hence, the system enables multiple hypothesis testing and very quick and accurate 3D fault interpretation.

Turning to the figures, the present approach may be utilized in conjunction with a 3D seismic data set generated using any suitable seismic surveying system. As depicted in FIG. 1, a high-level overview of one such seismic surveying system 10 is provided by way of example. In the depicted example, a subsurface volume 20 is probed by the seismic surveying system 10. The subsurface volume 20 may typically include various layers or strata 22 at different depths and orientations within the volume 20. These various strata 22 define respective boundaries and transitions within the volume which may act to reflect waves (e.g., acoustic or shear waves) propagating through the subsurface volume 20. Likewise, other features or geobodies within the subsurface volume may also include surfaces, transitions, or boundaries that act to reflect seismic waves. For the purpose of the present discussion, it may be assumed that one or more faults or other discontinuities may exist at various locations with respect to certain of these layers or strata.

In the depicted example, a seismic generator 28 of some form (such as one or more controlled detonations, an air gun or cannon, or another suitable source of seismic waves) is part of the seismic surveying system 10. The seismic generator 28 can typically be moved to different positions on the surface of the volume 20 and can be used to generate seismic waves 30 at different positions on the surface 32 that penetrate the subsurface volume 20 under investigation. The various boundaries or transitions within the subsurface 20 (either associated with the various layers or strata 22 or with more complex geobodies) cause the reflection 40 of some number of the seismic waves 30. One or more transducers 44 at the surface 32 may be used to detect the waves 40 reflected by the internal structures of the subsurface volume 20 and to generate responsive signals (i.e., electrical or sonic signals).

These signals, when carefully processed, represent the internal boundaries and features of the subsurface volume 20. For example, in the depicted embodiment, the signals are provided to one or more computers 50 or other suitable processor-based devices that may be used to process the signals and generate a volume depicting the internal features of the subsurface volume 20. In one embodiment, the computer 50 may be a processor-based system having a non-volatile storage 52 (such as a magnetic or solid state hard drive or an optical media) suitable for storing the data or signals generated by the transducer 44 as well as one or more processor-executable routines or algorithms, as discussed herein, suitable for processing the generated data or signals in accordance with the present approaches. In addition, the computer 50 may include a volatile memory component 54 suitable for storing data and signals as well as processor-executable routines or algorithms prior to handling by the processor 56. The processor 56 may, in turn, generate additional data (such as a computer-assisted fault interpretation for the subsurface volume 20) upon executing the stored algorithms in accordance with the present approaches. The seismically processed data and any additional analysis (such as an assisted fault interpretation) generated by the processor 56 may be stored in the memory 54 or the storage device 52 or may be displayed for review, such as on an attached display 60. As will be appreciated, the various acts associated with seismic reconstruction and with user-assisted fault interpretation, as discussed herein, may be performed on separate processor-based systems (e.g., computers).

Any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits.

Figure 2:
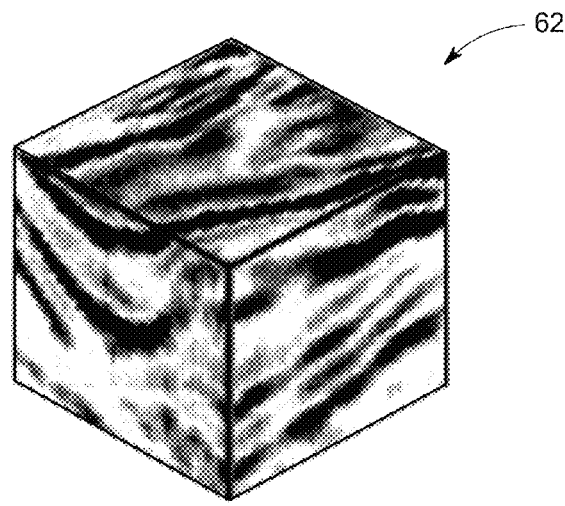
FIG. 2 depicts an example of a volume of seismic data for analysis, in accordance with aspects of the present disclosure.

Turning to FIG. 2, a representation of a portion 62 of 3D seismic data of a subsurface volume 20 is depicted. As depicted in FIG. 2, such a subvolume 62 may depict features of the subsurface volume 20, such as various strata, layers, and geobodies, which due to geological processes and time scales, may be at various orientations relative to one another. As may be appreciated, manual inspection of large amounts of such data may be challenging and time-consuming.

In a 2D slice of seismic image data, such as a slice through a volume 20 or subvolume 62, the continuous pattern of seismic layers can be interrupted by a fault surface. At a fault surface, the seismic layer pattern is interrupted, but the seismic layer pattern generally continues on the other side of the fault after a displacement up or down at the fault surface. As discussed herein, in fault interpretation operations it may be desirable to determine both the fault surface and the displacement across the surface.

With the preceding discussion in mind, the present disclosure relates to computer-assisted fault interpretation approaches that provide an efficient workflow. In particular, as discussed herein, in certain implementations the present approach allows multiple hypotheses to be quickly formulated and efficiently validated or invalidated in the respective 3D seismic data. Unlike existing approaches, the present approach is efficient because it is not necessary that the horizons on each side of a fault be interpreted, nor does the present approach require pre-computation of the fault surface.

Figure 3:
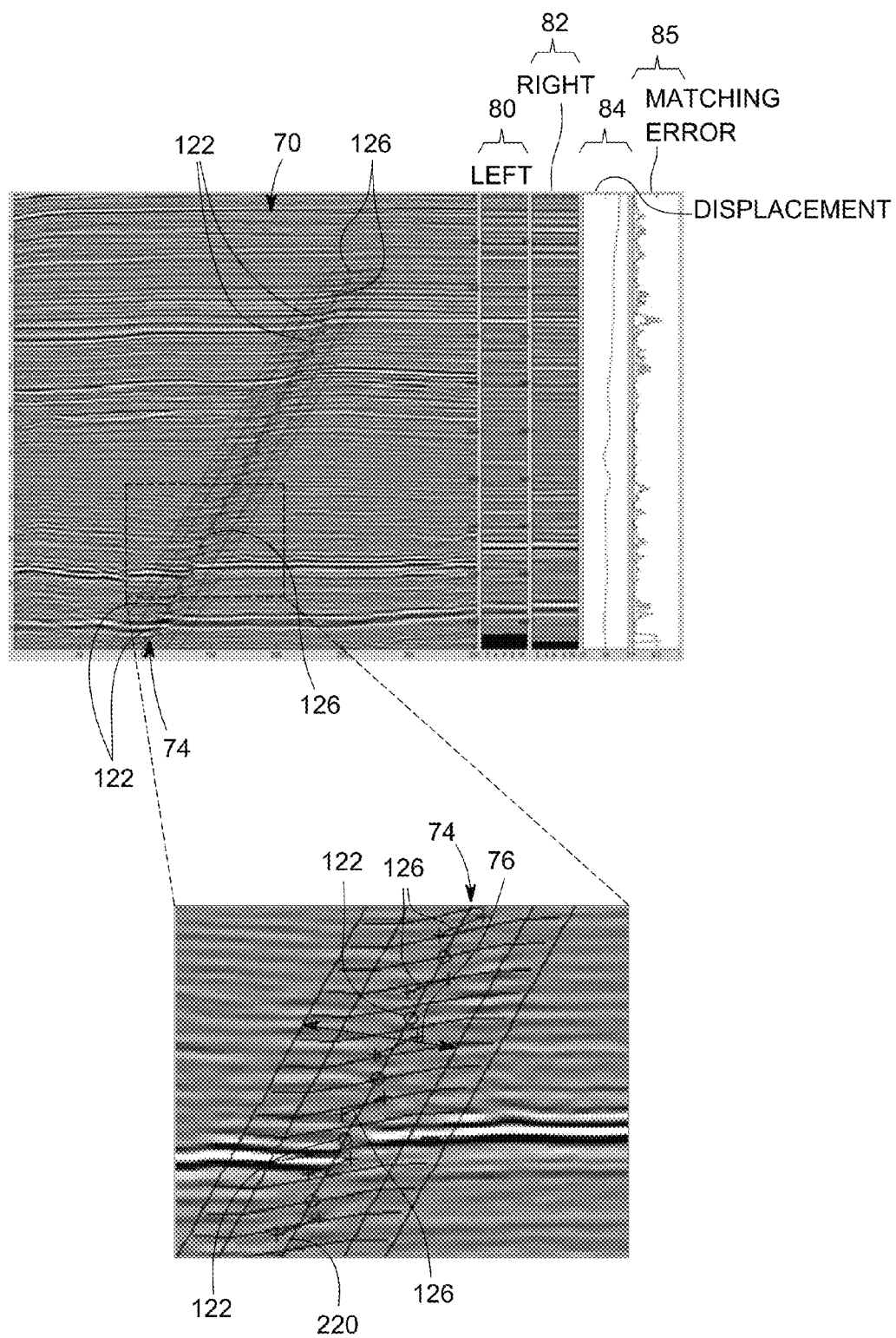
FIG. 3 depicts an example of an image slice, including a fault, in accordance with aspects of the present disclosure.

Turning briefly to FIG. 3, an example of a slice and fault is depicted to illustrate certain aspects of the present concepts and to facilitate discussion of the present approach. In the depicted example, a two-dimensional (2D) slice 70 is depicted that is an inline or crossline slice from a large seismic volume 72. A fault 74 is depicted within the slice 70 which separates two sides (i.e., the hanging wall and the foot wall) of the geological formation. The two sides of the fault are separated by a dead zone 76. The extent of the regions on each side are referred to as swaths. The top figure in FIG. 3 shows both swaths (i.e., left aligned swath 80 and right aligned swath 82) side by side. In the depicted example, two sets of control points are defined, as discussed below, and are used by the computer-implemented optimization. As used herein, "control points" are points generated, maintained, and moved or optimized by operation of a computer-assisted fault interpretation algorithm, as discussed herein (i.e., in this context, the "control points" are internal to the 2D aspect of the computer-assisted fault interpretation algorithm). For example, the control points may be characterized as the parameters of the fault model generated or optimized by the algorithm. In such an implementation, the control points are not manipulated (e.g., generated, moved, or otherwise altered) by a user. In certain embodiments discussed herein, there are two different types of control points, surface control points and offset control points. Surface control points 122 are automatically fitted to the fault surface by the algorithm (such as based on initial user inputs or hints) and are indicative of the position of the fault surface. Such surface control points 122 may be moved or changed by the algorithm as the fitting process proceeds. Displacement control points 126 are also generated and refined automatically by the algorithm (such as based on initial user inputs or hints) and may, in certain embodiments, be used for making match hypotheses. In the depicted example, the estimated displacements may be plotted on an estimated displacement graph or map 84. Fault displacement is defined as the offset (i.e., fault throw) that is needed to align one side of the fault with the other side. Similarly, an estimate of the matching error 85 may be plotted that conveys a visual representation of the mismatch between the left and right swaths 80, 82.

As noted above, the various control points may be initialized or derived at least in part based on user provided inputs or hints. As used herein, such "user hints" may be understood to encompass initial mouse clicks or other selections made by a reviewer to indicate approximately where a fault is and, possibly, what the approximate displacement is. In one implementation, the user hints may be provided as two mouse clicks on a single slice 70 to define a line that approximately lines up with the fault surface (i.e., a "two-click fault stick"). In certain instances, there might be more than two mouse clicks to help capture the curve of a fault surface. In some implementations, user hints may additionally be provided after execution of the 2D portion of the computer-assisted fault interpretation algorithm to improve performance or to help optimize the fitting of a model to a fault, as discussed herein.

Thus, as used generally herein, to initialize an instance of the fault interpretation algorithm, a 2D aspect of the algorithm may receive user inputs or hints (e.g., a "two-click fault stick"). Based on the user hints, the algorithm then initializes a number of surface control points and offset control points to initialize the fault model. As discussed in greater detail below, the 2D portion of the computer-assisted fault interpretation algorithm then automatically moves the control points around to improve the fit of the fault model. Thus, as used herein, the control points are the parameters of the fault model that are manipulable by the algorithm to initially define the fault model and to subsequently fit the fault model.

Figure 4:
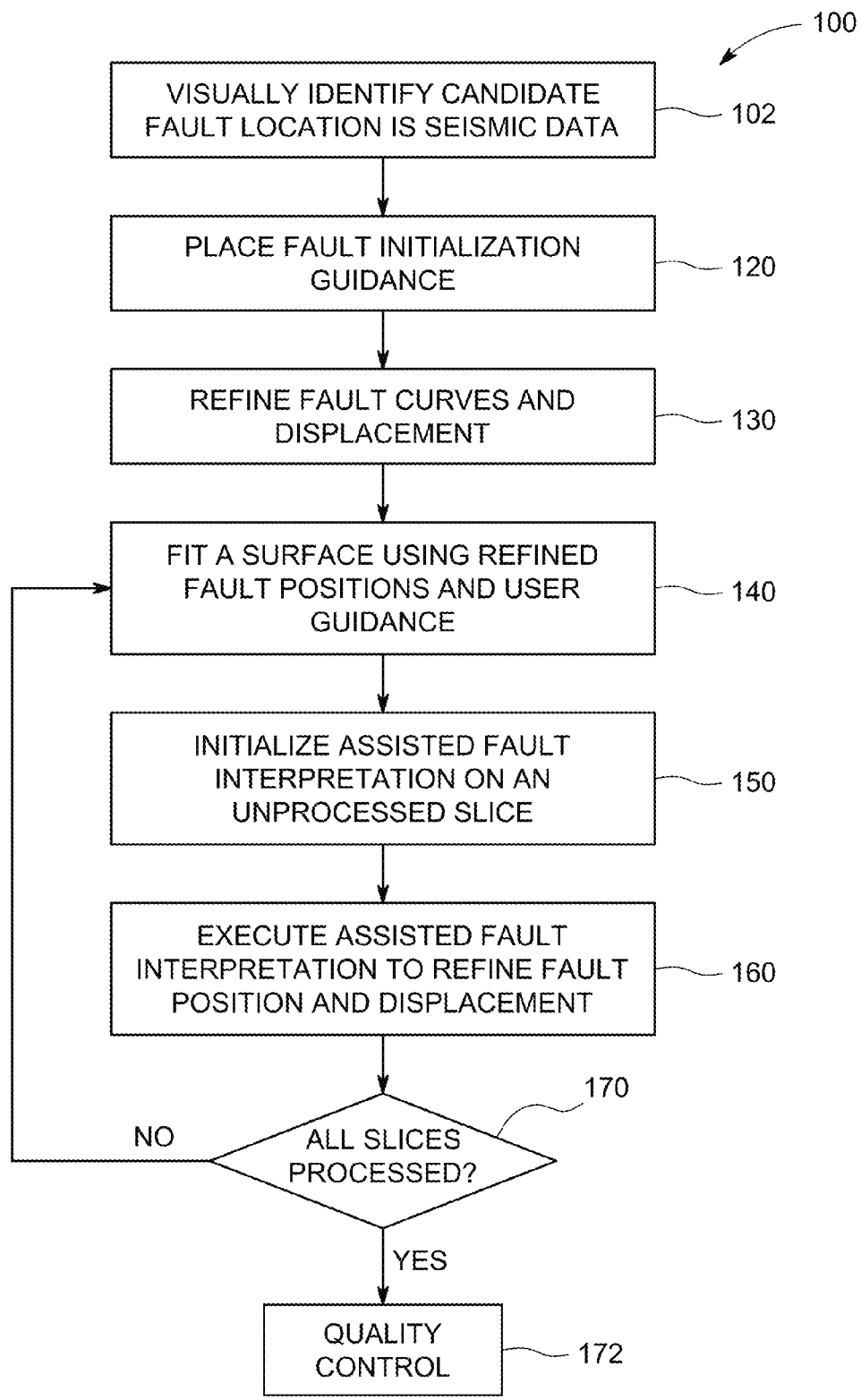
FIG. 4 depicts a flow diagram representing acts performed by a fault interpretation algorithm, in accordance with aspects of the present disclosure.
Figure 5:
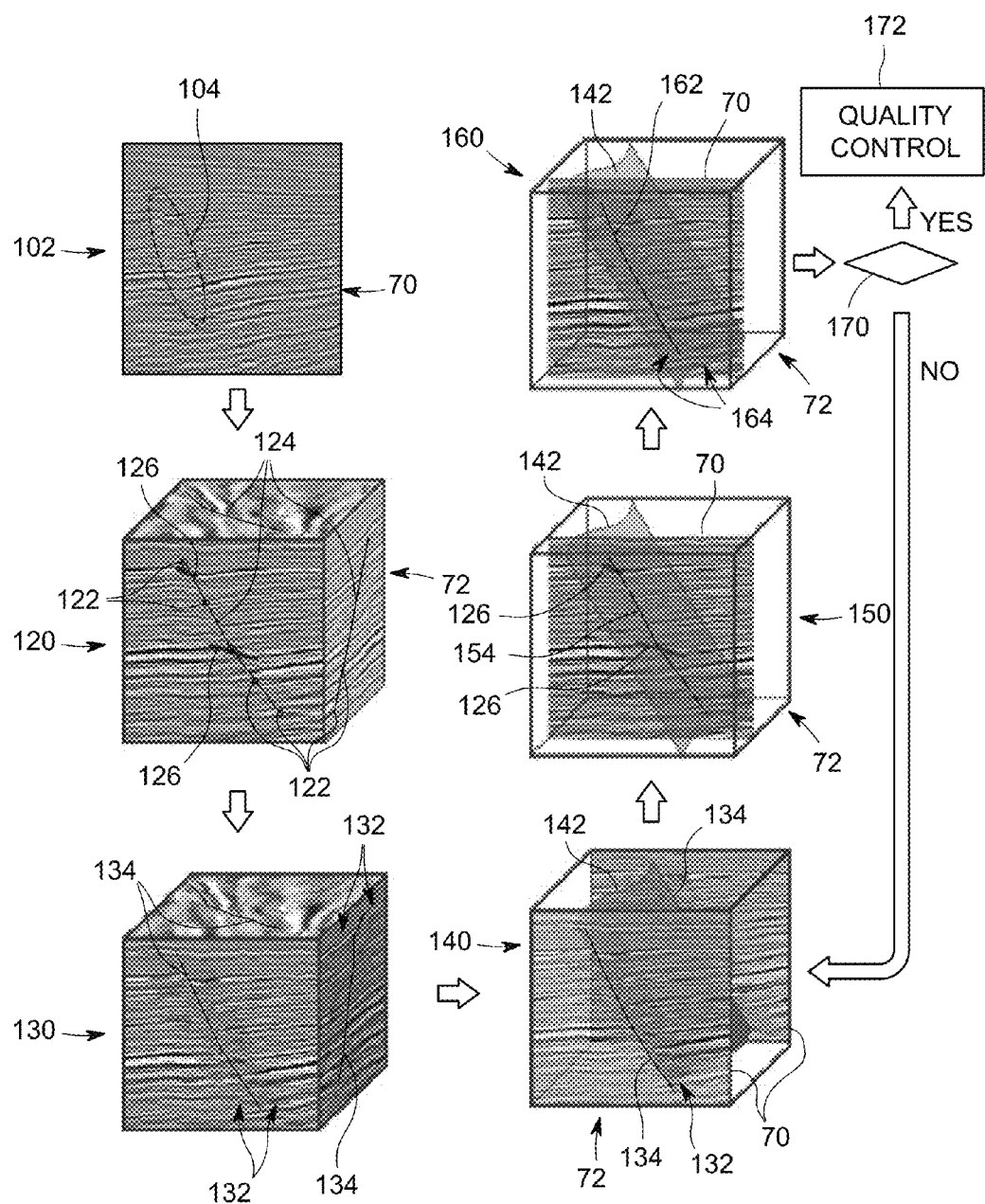
FIG. 5 depicts visual representations of the algorithm steps set forth in FIG. 4.

With the preceding discussion in mind, and turning to FIGS. 4 and 5, a sample workflow 100 for one implementation of the present approach is provided. In these figures, FIG. 4, provides a flow diagram of acts performed as part of the sample work flow, while FIG. 5 graphically depicts a sample volume and slices through the volume as the various acts are performed. It should be appreciated that certain aspects of the present approach, and systems implementing this approach, pertain to operations performed in two-dimensions, such as fitting a fault curve within a slice of seismic data, while other operations are performed in three dimensions, such as 3D interpolation and refinement of a fault surface within a seismic volume. In such implementations, the 3D operations may receive as inputs the outputs of the 2D operations. That is, with respect to computer-based implementations, there may be separate 2D and 3D fault interpretation algorithms in communication with one another or there may a fault interpretation algorithm having distinct 2D and 3D components. In view of these differing aspects and operations, it should be appreciated that 2D operations and aspects (e.g., fault curve fitting within a slice) may be performed separate and independent of the 3D operations, while the 3D operations and aspects typically utilize the outputs of the 2D operations (such as to interpolate and refine the 2D fits across a volume), and thus may not stand separately from the 2D operations.

In the depicted example, the workflow 100 begins (block 102) with a reviewer identifying one or more candidate fault locations 104 in a set of seismic data. It should be appreciated however that, in other embodiments, such an interactive step may be omitted or performed separately from the remainder of the workflow discussed herein. For example, instead of a reviewer performing the steps discussed below at steps 102 and 120 at the time of analysis, in other implementations the described analysis could instead be performed based on previously interpreted faults and horizons, without additional reviewer input (i.e., without performing steps 102 and 120, discussed below). Instead, in such implementations, the estimate of fault throw may be calculated from the horizons for the given faults, as previously determined.

Turning back to FIG. 4, however, in the depicted example it is assumed that fault and horizon information is yet to be determined and is, instead, derived based on an interactive session where reviewer feedback (i.e., "user hints") is at least initially obtained. In the depicted example, the seismic data reviewed for candidate fault locations is a 2D slice 70 taken from larger 3D seismic volume 72. In one implementation, the reviewer may review a limited number of slices 70 of a larger total number of slices (such as on two of twenty total slices in one example), thus limiting the amount of review activity that is performed. The candidate fault locations 104 may be identified using either raw image data or using an attribute such as coherency or discontinuity designed to highlight faults.

In one embodiment, based on the reviewer's exploration of the seismic data, a slice-processing (i.e., 2D) aspect of a computer-assisted fault interpretation algorithm is initialized using a limited number (i.e., less than the full set of slices) of inline, crossline, or time slices 70 on which the reviewer has provided initial guidance (step 120) (e.g., "hints") related to the location and/or displacement of a fault. For example, in one embodiment this slice-processing aspect of the algorithm operates on inline, crossline, or any other vertical or nearly vertical slice through a 3D volume. As noted above, in a manual initialization implementation, the reviewer may indicate an approximate fault surface location and/or displacement by clicking two or more points on the fault surface when the slice 70 is displayed as an image. Based on this user guidance, fault surface control points 122 may be generated by the algorithm and placed along the corresponding line or curve. Similarly, displacement control points 126 may be generated and placed by the algorithm in response to reviewer inputs corresponding to displacement across the fault or hints about the displacement.

In one embodiment, the slice-processing (i.e., 2D) aspect of a computer-assisted fault interpretation algorithm can start with no user guidance regarding displacement. In such an implementation, the algorithm may generate displacement control points that represent zero displacements for the entire fault surface. However, in other implementations the user might provide some quantification or estimate (i.e., a user hint) of displacement at a given location on the fault (e.g., a sloped line showing vertical displacement). While manual initialization by reviewer is one possibility, initialization could also be done based on fault detection information from a suitable automatic fault detection algorithm. The purpose of this initialization process, and the control points generated by the algorithm in response to the inputs provided by the reviewer or automated algorithm, are to localize a fault model (discussed below) in the vicinity of a fault.

In the depicted example, at step 120 of FIG. 4, the initial reviewer provides guidance which may be used by the algorithm to generate or place fault surface control points 122 within a cross-section 70. In the depicted example, fault locations between fault surface control points 122 are derived (e.g., interpolated) (depicted by curves 124), such as by using splines, to generate smooth interpolations. Fault surface control points 122 can be derived by the algorithm for any combination of multiple cross-sections, i.e. inline, crossline, or time slices 70. In one embodiment, to facilitate correlating the initial guidance provided on different slices 70, the splines may be visualized from different (or all) line directions. For example, a spline placed in an inline slice 70 may be rendered as a circle at its intersection location on crossline and timeline slices 70. In the depicted example, lines are used to indicate displacement 126. In one implementation, these hypotheses are entered in inline or crossline slices 70.

At step 130, the slice-processing aspect of the computer-assisted fault algorithm, refines the fault curve (depicted as curve 134) within a slice 70. In addition, the algorithm computes dense displacement between the two sides of the fault (i.e., the hanging wall and foot wall). In the depicted example, the inline and crossline fault surfaces and displacements are refined in this manner. After model fitting or refinement (discussed in greater detail below), the spline fit to the surface control points 122 provides a continuous function of the fault curve 134 within a slice 70. The displacement of the fault at any point on the fault curve may be determined from the intersection of the spline fit with the dense computed displacements. The respective displacements are depicted visually in FIG. 5 by lines 132 on either side of the refined fault curve 134.

In the depicted example, at step 140, a 3D fault interpretation aspect of the algorithm begins. In particular, a 3D surface 142 is fit using the current refined fault positions as identified in the respective 2D slices 70 (i.e., corresponding to the refined fault curves represented by lines 134) that have been initialized or otherwise processed. In the depicted example, the 3D surface 142 is fit using the refined fault positions, as determined at step 130, and, in some embodiments, using the reviewer guidance (i.e., hints) provided in time slices.

By way of further example, in this 3D fault interpretation stage, the algorithm may first estimate an initial 3D fault surface 142 based on the sparse fault curves 134 identified in the initialized (or previously processed) slices. In one implementation, this is done by fitting a bivariate polynomial using the sparse fault lines or curves 134 as input. For example, at step 120, discussed above, each fault curve on a different cross section may be determined to be a function of coordinate z (i.e., x=f(z)). Then, the 3D fault surface can be represented as a bivariate polynomial of x=f(z, y). The order of the bivariate polynomial is fixed, and may be in the range of 4 to 6. As shown at step 140 in FIG. 5, a fitted fault surface 142 is shown that minimizes its Euclidian distance to the fault lines 134.

The 3D fault surface 142 may subsequently be optimized. For example, at step 150, for a slice 70 that contains the fault and that has not been processed, the computer-assisted fault interpretation algorithm may be initialized for the slice 70 in question using the refined interpretation (i.e., 3D surface 142) from step 140 (i.e., based on the fitted surface 142). For example, in one implementation, the fault interpretation algorithm may be initialized for unprocessed slice 70 using an interpolated interpretation, or other estimated or expected fault position (depicted in FIG. 4 by curve 154), derived based on the fitted surface 142 and the projected intersection of the fitted surface 142 with slice 70. For the slice 70 in question, the computer-assisted fault interpretation algorithm may next (step 160) refine the fault position within the slice 70 (depicted by curve 162). In addition, the respective displacements 164 may be determined based upon the hanging wall and foot wall determined for this refined fault position within the slice 70.

By way of example, in the context of processing a seismic volume 72, an implementation may occur as follows. Using the fitted 3D surface 142 as input, the algorithm may compute the fault surface position and fault displacement for the entire fault volume by invoking the 2D or slice-processing aspects of the algorithm on a set of continuous 2D slices 70. The fault volume may be bounded by a bounding box derived based on the initial guidance provided by a reviewer or automated fault detection algorithm. These 2D slices 70 can be either crossline or inline slices, depending on the reviewer's preference.

For each 2D slice 70 that is within the bounded fault volume, the intersection curve 154 between the 2D slice 70 and the fitted 3D surface 142 is used to initialize the slice-processing (i.e., 2D) aspect of the algorithm. In one implementation, a small number of control points (e.g., 3) may be uniformly sampled from the intersection curve 154. These control points may be used by the slice-processing aspect of the algorithm as initialization points to refine fault surface location and estimate fault displacements for a given 2D slice 70. Similarly, constraints from fault displacement hypothesis may be passed through adjacent or proximate cross sections to refine and guide the search in the new slices 70.

If a determination is made (decision block 170) that a refined fault position has been determined for all 2D slices (i.e., all 2D slices within the volume have been processed), the algorithm may proceed to a quality control step 172. If not, the process may iterate, returning to step 140 to re-fit the fault surface 142 and proceeding to process any 2D slices 70 for which the fault position has not been determined.

Figure 6:
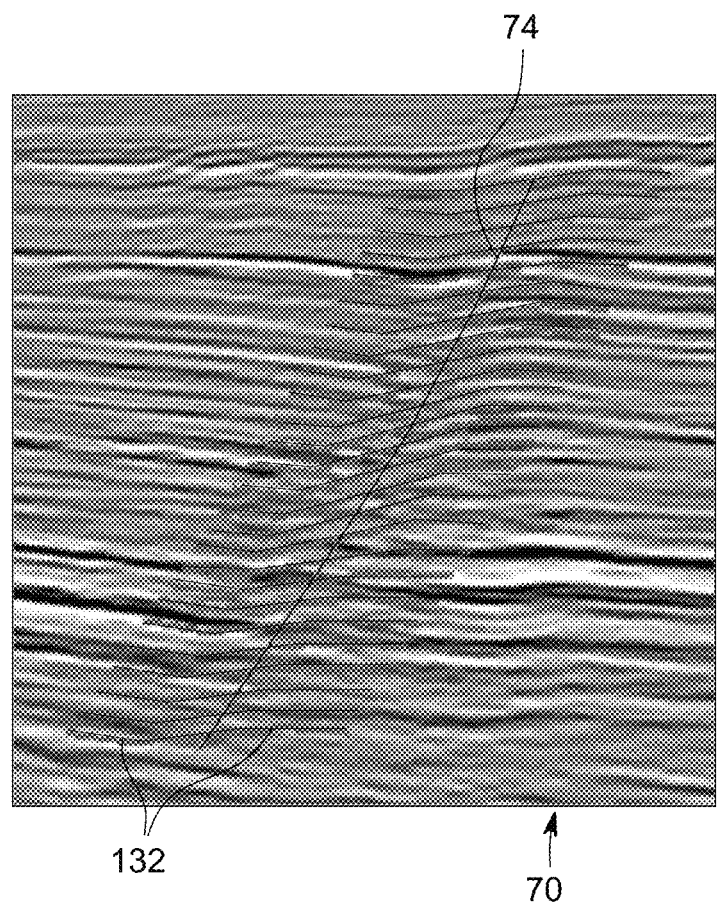
FIG. 6 depicts a first visualization of algorithm results, in accordance with aspects of the present disclosure.
Figure 7:
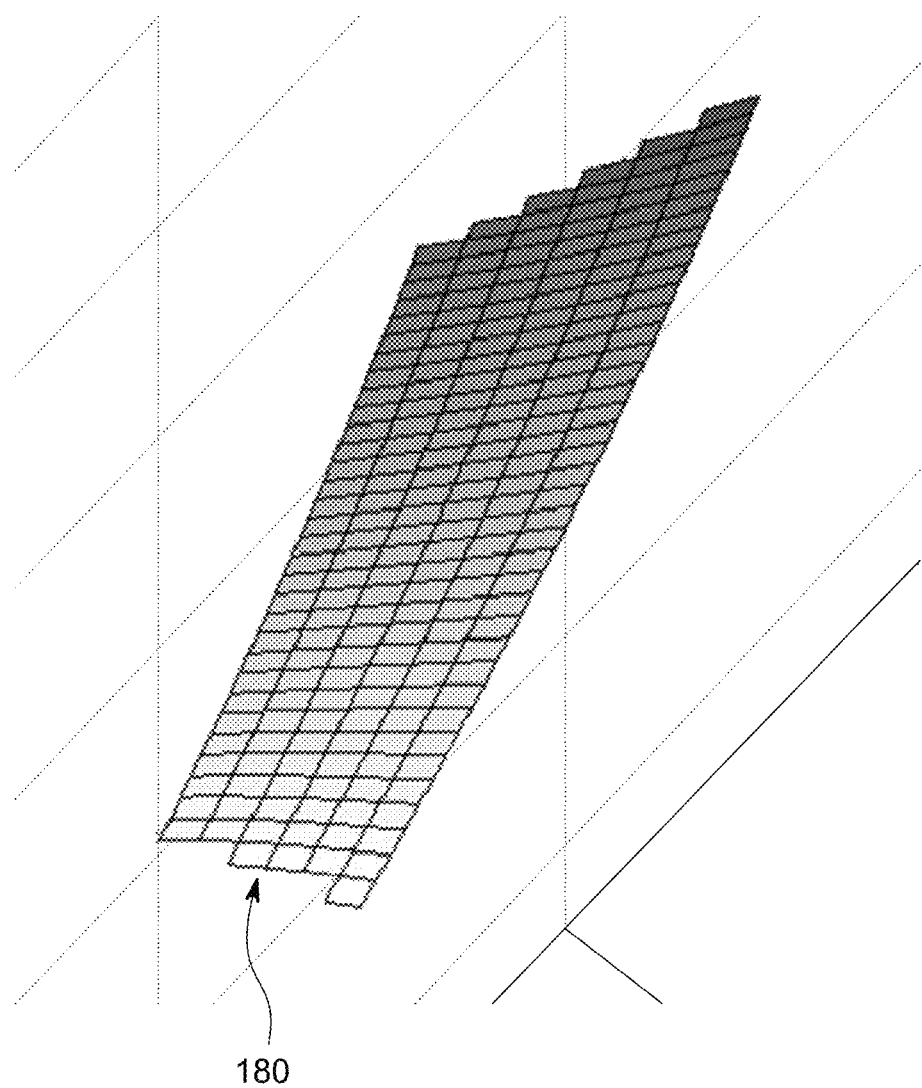
FIG. 7 depicts a second visualization of algorithm results, in accordance with aspects of the present disclosure.
Figure 8:
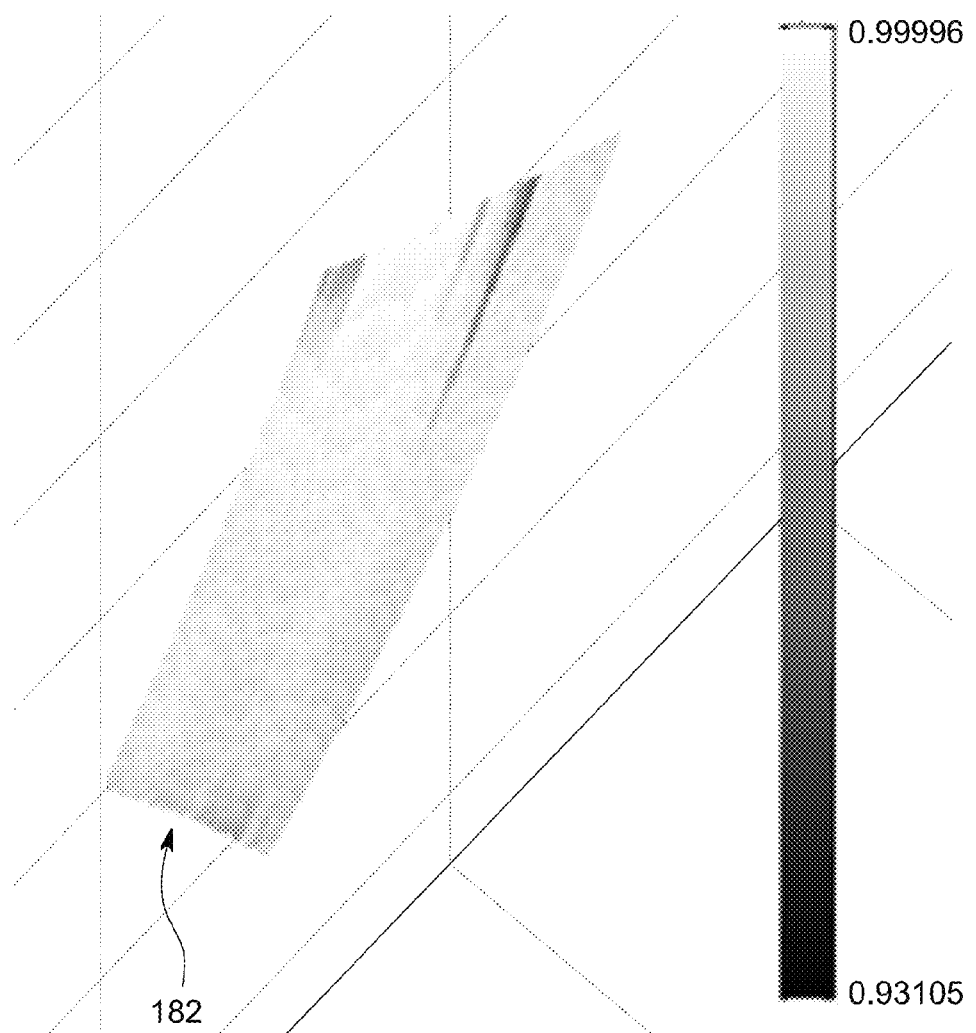
FIG. 8 depicts a third visualization of algorithm results, in accordance with aspects of the present disclosure.
Figure 9:
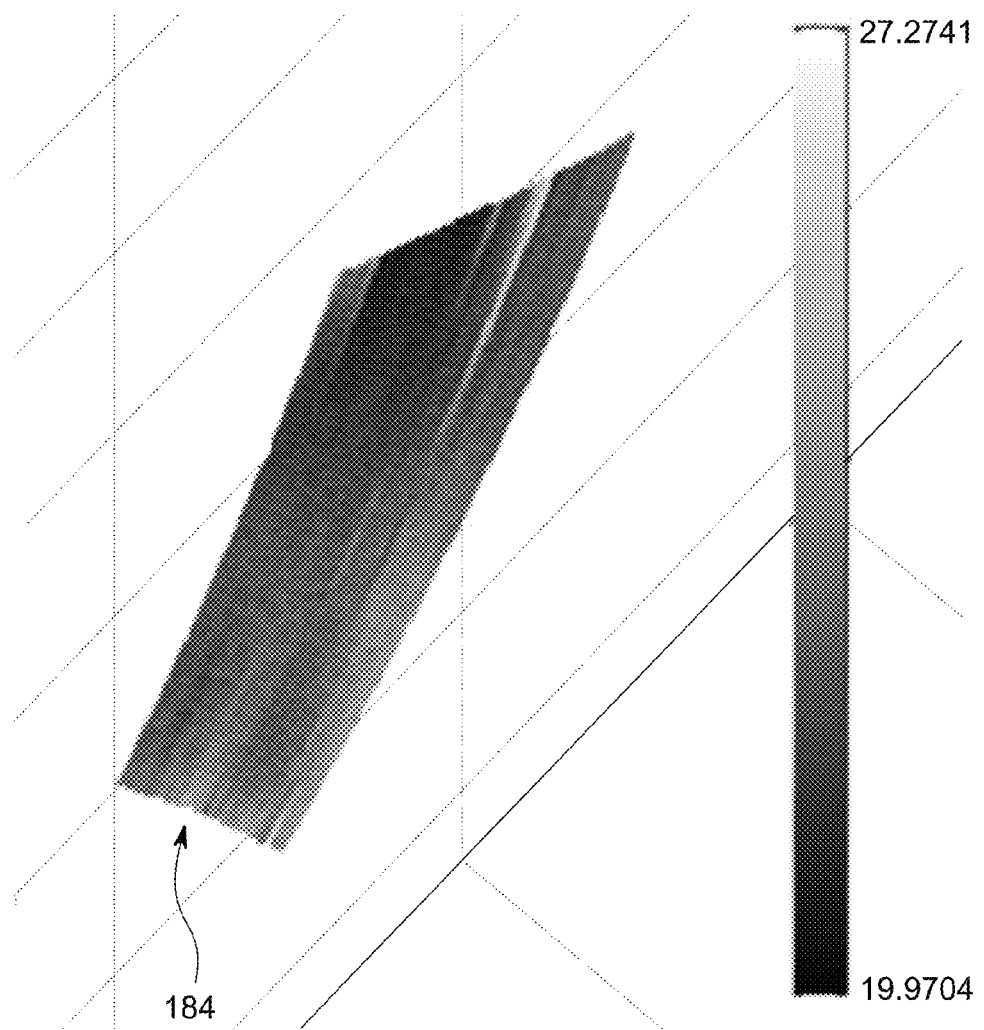
FIG. 9 depicts a fourth visualization of algorithm results, in accordance with aspects of the present disclosure.
Figure 10:
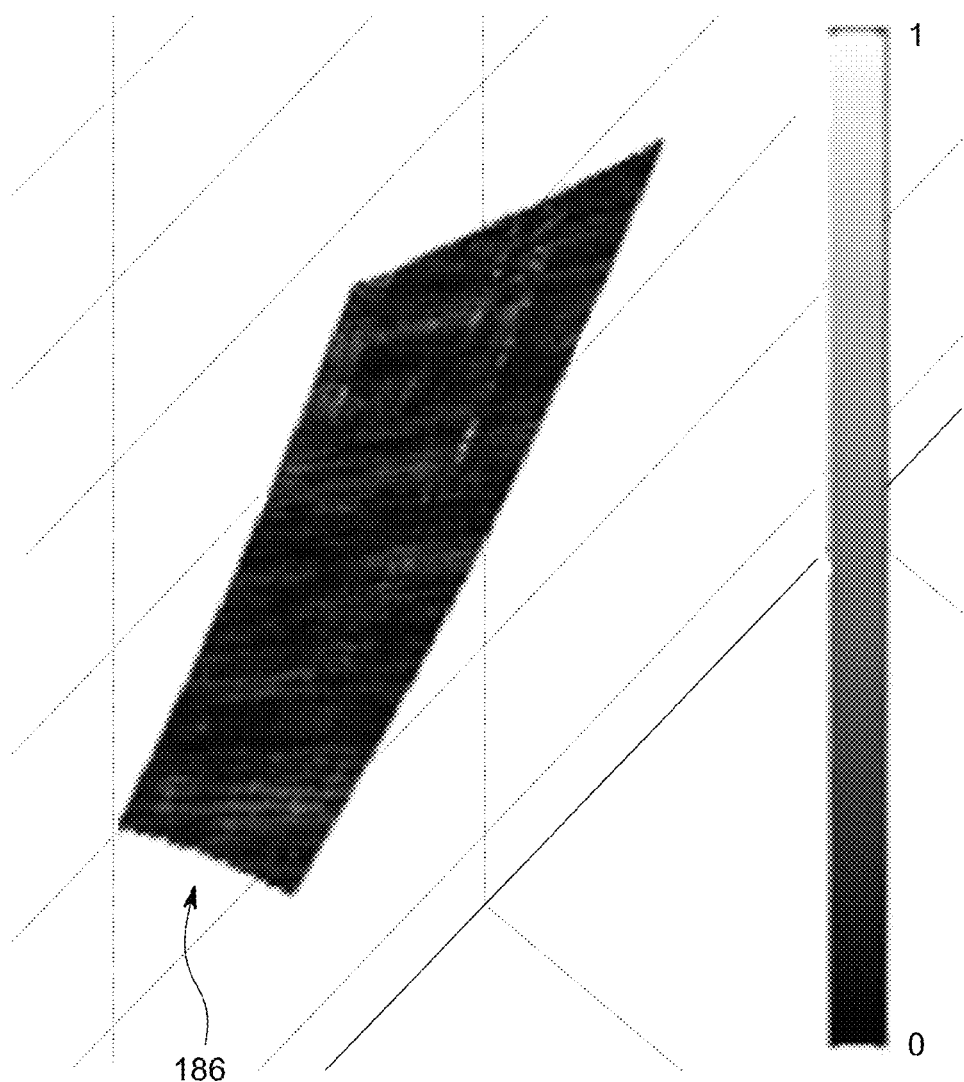
FIG. 10 depicts a fifth visualization of algorithm results, in accordance with aspects of the present disclosure.

With respect to the quality control or validation step, in certain implementations, fault position and fault displacement results generated by the computer-assisted fault interpretation algorithm are displayed for review. For example, turning to FIG. 6, in one embodiment, the results (e.g., fault location 74 and displacement 132) can be superimposed onto 2D cross sections 106 for review. Alternatively, in another view shown in FIG. 7, the fault surface may be visualized as a 3D mesh 180 for review. In another validation view shown in FIG. 8, one component of the displacement vectors generated as part of the model fitting process for the fault surface (discussed in greater detail below) may be visualized as a color coded heat map 182. The XYZ components of the displacement vectors may be stored as three heat maps. As shown in FIG. 9, the displacement magnitude in pixels can also be visualized on the fault surface as a heat map 184. In addition, the cost function (as discussed in greater detail below) represents the degree of uncertainty of fit and of stratigraphic similarity across the fault 74. This can be displayed as a heat map 186 of the normalized matching error on the fault surface, as shown in FIG. 10. Using these or other displayed products of the computer-assisted fault interpretation algorithm, a reviewer can validate the results at step 172. If an error is identified on a slice (i.e., slice 70), the reviewer can cause the algorithm to re-compute the fault by providing a new hypothesis of fault location and displacement (i.e., new or additional user guidance or hints).

Thus, in one embodiment the reviewer initially provides guidance on some subset of initial slices from a volumetric set of data (e.g., 2, 3, 4, or more slices of some larger set of slices). For each instance where the reviewer has provided an initial interpretation or guidance on a crossline or inline slice, the slice-processing aspect of the computer-assisted fault interpretation algorithm is invoked to compute the fault position and fault displacement within the respective slice. In one embodiment, this results in a sparse set of fault curves that spans the fault volume. In one implementation, the algorithm uses the displacement hypothesis to constrain computing the fault position and fault displacement automatically.

While the preceding provides an overview of the present approach and, in particular, of the overall workflow of the approach, the following discussion goes into greater detail into particular aspects. For example, with respect to the slice-processing (i.e., 2D) aspect of the computer-assisted fault interpretation algorithm discussed above, the module or routines associated with this aspect define and utilize a fault model to represent the location and extent of the fault surface, the displacement of the fault along the surface, and whether the seismic layer pattern of each side of the fault matches after accounting for the displacement. In one implementation, the model has three main parts: the fault surface, the displacement and aligned swaths.

As discussed above, with respect to the fault surface component of the model, in one embodiment the fault surface is modeled by the algorithm with a series of discrete fault surface control points 122 and splines 220 (as shown in FIG. 3). In one embodiment, each surface control point 122 is defined by a row and columns index in the vertical slice image 70. In one implementation, a surface control point 122 is placed at an arbitrary spacing (e.g., about every 50 to 100 image pixels) along the fault 74. A continuous spline function may be fit to these control points 122 to define the fault curve. In one embodiment, a bicubic spline is used, but any spline function that is parameterized by discrete control points can be used. The spline function may start and end at the first and last surface control points 122 defined for a given fault 74 or may be extrapolated some distance beyond these terminal control points. Where the spline surface stops at either end is defined by the model. The fault surface is parameterized based on distance, s, along the spline surface. For any distance s, the spline function, and thus the fault surface model, provides x,y=f(s), the actual surface point in the image.

With respect to the fault displacement component of the fault model, in one embodiment the fault displacement is also modeled using a spline function. For example, a series of discrete displacement control points 126 (which may take the form of a flat line (where there is zero displacement) or a sloped line) may be placed at prescribed distances along the fault surface. In this embodiment, each pair of displacement control point 126 represent the fault displacement at that point. The displacement control points 126 may be placed arbitrarily (e.g., every 50 pixels, every 100 pixels, and so forth) within the slice. Each pair of displacement control point 126 defines the displacement of the fault 74 at a fault surface position s, or image location x,y=f(s). Displacement is defined as the distance along the fault surface between corresponding points of the seismic data on the left and right sides (i.e., swathes) of the fault 74. A spline function may be fit to these displacement control points 126 to interpolate and extrapolate the displacement continuously along the entire fault surface.

With respect to the aligned swaths component of the model, in one embodiment the model defines a left and right aligned swath 80, 82. These swaths are sections of the image near the fault surface that are resampled using the fault surface and displacement components of the model in such a way that, if the model surface and displacement are accurate, then the left and right swaths 80, 82 align and flatten the seismic image data so that the swaths match. In a sense, this process warps sections of the 2D image, i.e., slice 70, to undo the effect of the fault 74 and locally flatten the seismic layers.

One useful feature of the swaths 80, 82 is that the seismic layer patterns are flattened, or made horizontal in them. To achieve this flattening, the local orientation of the seismic layers must be known. In certain implementations of the present algorithm, this local orientation information may be determined using structure tensor analysis on the 3D data volume to determine the normal vector to the dominant seismic layers in any region of the image as a preprocessing stem. Then 3D normals may be projected to 2D normals for the 2D slice 70 under analysis. However, any method of determining the dominant seismic layer angles can be used, such as using commercial seismic interpretation software.

Figure 11:
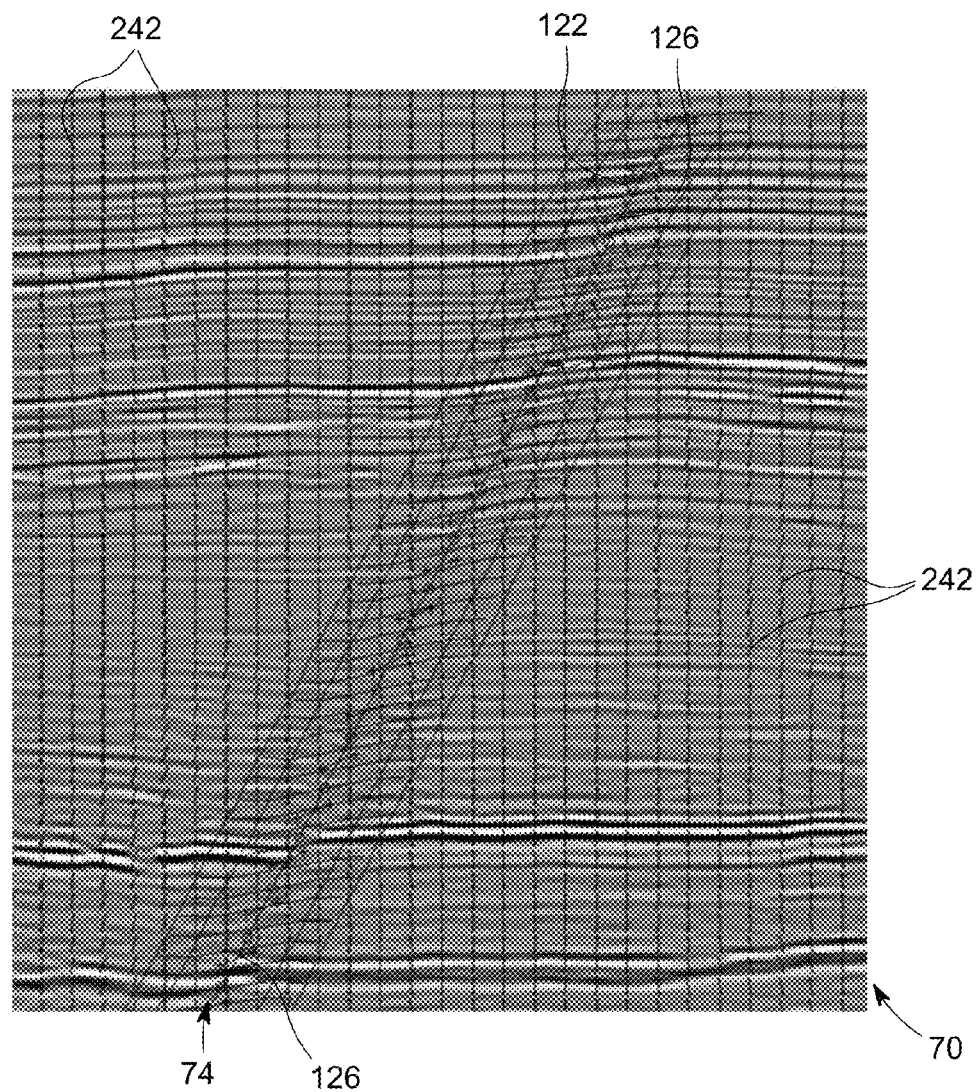
FIG. 11 depicts a slice including a modeled fault and normal vectors, in accordance with aspects of the present disclosure.

Turning to FIG. 11, by way of example, a slice 70 is depicted showing a view of a modeled fault 74 along with sample normal vectors 242 used to flatten the corresponding swath images.

In one embodiment, the left swath 80 (see FIG. 3) is an image with approximately 20 columns and a number of rows commensurate with the total length of the fault surface. The resampling of the left swath 80 can be defined in terms of the mapping of each swath pixel to a location in the original 2D image. This image to image mapping defines the warping and sampling process that creates the swath from the original 2D image. For a given row and column in the left swath 80, one first moves down the fault surface a distance of row pixels. The determination of the distance to move down the fault surface may also include a scale factor or may be based on real-world distances, if known.

Next, the location on the fault surface is moved up or down, based on the fault displacement at that location. The fault displacement is determined from the displacement model. One then moves up the fault surface by half of the displacement distance, with a negative displacement resulting in moving downward.

For some distance (e.g., 20 or so pixels) to the left of this point on the fault surface the upward pointing normal vector to the dominant seismic layer pattern is determined. It may be assumed that this normal vector is reasonable for this region to the left of the fault surface. This normal vector is rotated 90 degrees counter clock-wise so it points to the left of the surface and is parallel to the dominant seismic layers. Next, on the 2D image, in the direction of this vector one moves a fixed deadzone distance plus a distance of column pixels. Again, a scaling factor and/or real-world distances may be used, if known. The original 2D image, sampled at this point is the value of the left swath image for this row and column. The deadzone distance (e.g., about 5-10 pixels), may be used to skip over and ignore the portion of the 2D seismic image near the fault surface, which is often not well imaged.

The right swath image 82 (see FIG. 3) may be determined in a similar manner, adjusted to account for differences attributable to symmetry. For example, one moves down the fault surface by half of the displacement distance. Similarly, the dominant seismic layer normal is from a point about 20 pixels to the right of the fault surface and the normal vector is rotated 90 degrees clock-wise.

With the preceding description of the model in mind, placement and refinement of the surface and displacement control points by the algorithm results in the model fitting the fault 74. That is, when the surface control points 122 and displacement control points 126 placed by the algorithm are determined to be accurate, the modeled fault surface overlays and fits the actual fault surface. Likewise, the modeled displacement may match the actual displacement of the fault. Similarly, the left and right swaths 80, 82 match each other, since, when the model is properly fitted, the swaths 80, 82 are flattened and are corrected for fault displacement.

Figure 12:
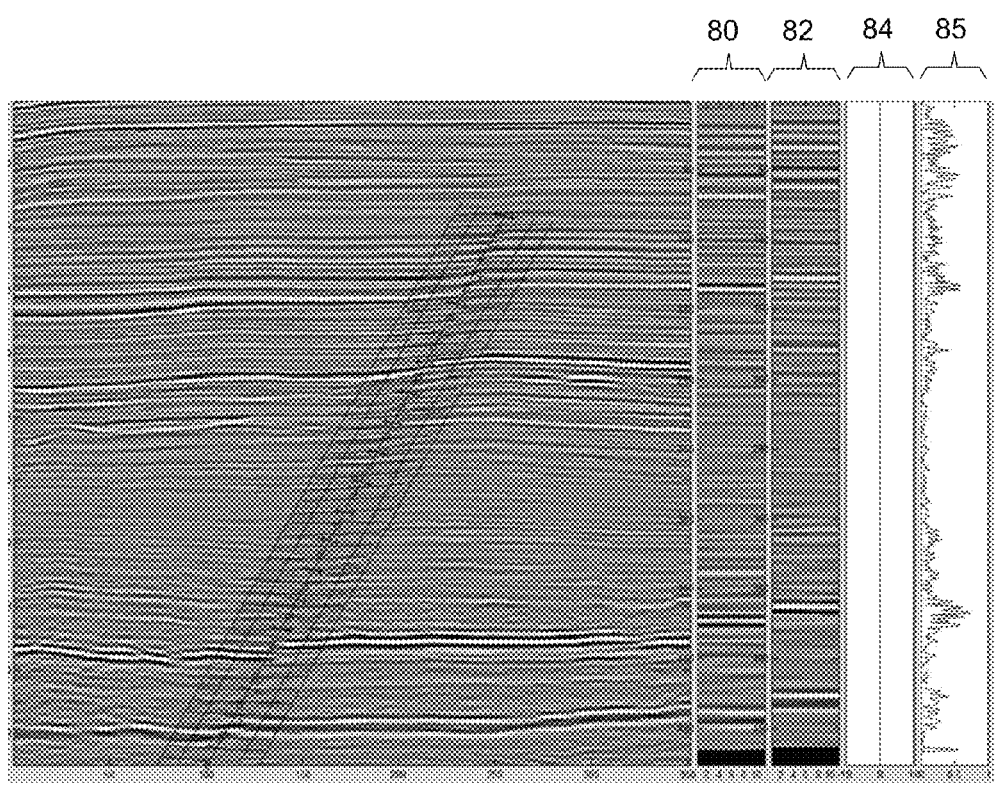
FIG. 12 depicts a model initialization on a fault within a slice, in accordance with aspects of the present disclosure.
Figure 13:
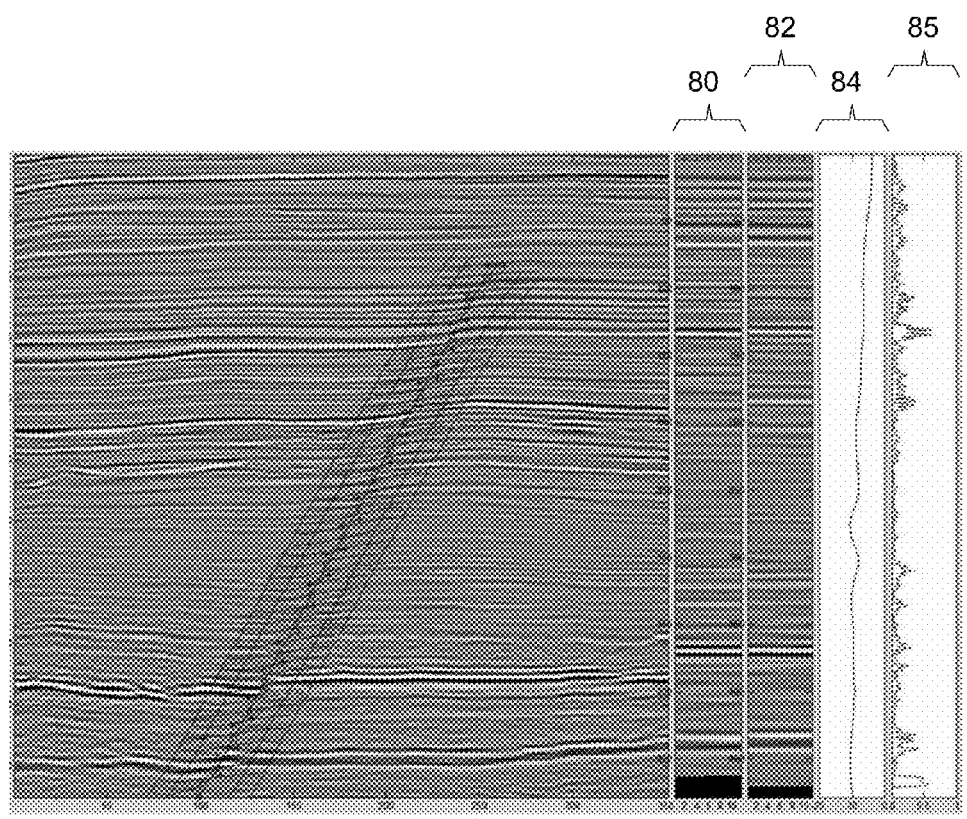
FIG. 13 shows a fitted fault model based on the initialization shown in FIG. 12, in accordance with aspects of the present disclosure.

With this in mind fitting of the fault model is discussed in greater detail. Turning to FIGS. 12 and 13, FIG. 12 shows model initialization on a fault 74 using a straight line and no displacement. FIG. 13 shows the model fitting results of the fault 74 of FIG. 12 after automatic fitting to the fault, as discussed herein. In one implementation, the slice-processing aspect of the present computer-assisted fault interpretation algorithm uses the model discussed herein to automatically "lock on" to a fault, lining up with and matching the real fault surface and displacement, even when the initialization is merely a straight line approximation and with no provided displacement estimates. The fault surface and displacement are extracted based on the model and the optimized control points. For example, in one embodiment, the fitting process is based on optimization of the control point values (surface control points 122 and displacement control points 126) to minimize the difference between the left and right swaths 80, 82. In one implementation, the difference may be computed as the mean of the absolute differences between all corresponding pixels. However, other image difference metrics may instead be employed, such as root mean square (RMS) difference after image smoothing.

In one embodiment, the mean absolute difference between the corresponding pixels values in the two swath images 80, 82 is computed and represented as J, a function of the surface control point values and displacement control point values. Finding the values of the surface and displacement control points that minimize J, and thus represent the best model fit, is an optimization problem that can be solved using iterative techniques, such as steepest descent or conjugate gradient, or other suitable techniques.

In one implementation, the computer-assisted fault interpretation algorithm employs a set of search rules to iteratively find the surface and displacement control point values that minimize J, thereby making the model fit to a fault as accurately as possible. Examples of search rules used for optimization of the displacement control point values may include, but are not limited to: (1) global displacement (e.g., incrementally change the displacement of each displacement control point 126 over a range, such as from about −50 to 50 by 2 pixel increments); (2) individual displacement (e.g., for each displacement control point 126 in turn, incrementally change the displacement over a range, such as from about −4 to 4 by 0.5 pixel increments); and (3) group displacement (e.g., for various or all possible consecutive groups of displacement control points 126 having two or more control points, incrementally change the displacement of each displacement control point 126 in a manner that imposes a degree of expansion on one side of the fault 74 and contraction on the other side).

Similarly, examples of search rules used for optimization of the surface control point values may include, but are not limited to: (1) global surface (e.g., shift all surface control points 122 left and right, such as over a range of about −5 to 5 pixels by 1 pixel increments); and (2) individual surface (e.g., for each surface control point 122 in turn, shift the control point left and right, such as over a range of about −5 to 5 pixels by 1 pixel increments).

In these examples, the search or optimization rule varies one or more of the control point values (surface or displacement) in a range and the cost function J is computed at each step. In one such implementation, the control point values that minimize the cost function J are kept as the new baseline model parameters from which further searching proceeds.

As may be appreciated, the present approach differs from conventional approaches in various ways. For example, in accordance with the present approach, the fault interpretation search engine (i.e., model optimization) uses the image data, as opposed to actual seismic traces. Similarly, the hanging wall and foot wall (i.e., the areas to the left and right of the fault 74) are matched concurrently with the search for the optimal fault surfaces. Further, fault displacement offsets and an error function may be recorded to provide an indication of the quality of the match. Lastly, a visual estimate of correlation may be provided to help assess the quality of the results.

One of the advantages of the present approach is that the fault surface and fault displacement may be jointly, as opposed to separately, estimated. Further, the search algorithm work as an iterative surface fitting scheme. Instead of simply marching through all the 2D slices within the bounding box from small to large line number (i.e., processing sequentially through the volume), the algorithm processes the 2D slices 70 based on their distance to the user-supplied initial guidance. That is, slices 70 closer to the initial fault line guidance are processed earlier. After each time slice-processing aspect of the algorithm is performed to compute fault location on a 2D slice 70, the newly computed fault line is added to the set of all the fault lines, which are used to compute the bivariate polynomial fitting again. In this robust way, the fitted polynomial is continuously refined using the newest data.

Technical effects of the invention include, but are not limited to, computer-assisted fault interpretation within a seismic volume based on a limited number of interpreted slices (e.g., 1 in 10 slices being initially interpreted). Technical effects also may include parallelization to accelerate fault interpretation using the present algorithm such that multiple faults can be processed in parallel. Other technical effects include estimation of the displacements between the two sides of a fault as part of the fault interpretation process. In addition, multiple hypothesis generation and testing with respect to fault interpretation are supported by the present algorithm. Further technical effects may include a system configured to receive limited or sparse user guidance or inputs on a limited set of slices of seismic data and to automatically derive a fault surface and corresponding displacements within a corresponding seismic volume.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A seismic fault interpretation system, comprising:
   a memory storing one or more routines; and
   a processor that executes the one or more routines stored in the memory, wherein the one or more routines, when executed by the processor, causes the processor to,
   obtain a 3D seismic volume containing a fault, wherein the seismic volume comprises a plurality of 2D slices,
   receive a subset of the plurality of slices,
   generate two or more control points associated with the fault for each slice of the subset of slices,
   based on the control points for each respective slice of the subset, determine a 2D fault curve and associated displacements for the fault in each respective slice of the subset of slices,
   fit a 3D fault surface through the whole seismic volume based on the respective fault curves determined in the subset of slices,
   for each slice of the plurality of slices not included in the subset, determine a derived 2D fault curve for each respective slice based on an intersection of the 3D fault surface with the slice;

for each slice of the plurality of slices not included in the subset, determine a displacement that associates two sides of the derived fault curve determined for the respective slice, wherein the displacement is determined based on an intersection of the 3D fault surface and the associated displacements, compute a 3D fault displacement map on the 3D fault surface, generate one or more images comprising the 3D fault surface and the 3D fault displacement map derived for the seismic volume, and output, to a display device, the one or more images comprising the 3D fault surface and the 3D fault displacement map derived for the seismic volume.

2. The seismic fault interpretation system of claim 1, wherein the subset of the plurality of slices comprises less than all of the plurality of slices.

3. The seismic fault interpretation system of claim 1, wherein the two or more control points comprise at least fault surface control points.

4. The seismic fault interpretation system of claim 3, wherein the two or more control points further comprise displacement control points in addition to the fault surface control points.

5. The seismic fault interpretation system of claim 1, wherein the one or more routines, when executed by the processor, causes the processor to:

refine the fit of the 3D fault surface based on at least the fault curves determined for the plurality of slices.

6. The seismic fault interpretation system of claim 1, wherein the control points provided on the subset of slices are derived based on one or more inputs entered manually by a reviewer or automatically by a fault detection algorithm.

7. The seismic fault interpretation system of claim 1, wherein the subset of slices comprises about 5% to 10% of the plurality of slices.

8. A computer-assisted fault interpretation method for analyzing seismic data, comprising the acts of:

receiving as an input a subset of 2D slices taken from a larger set of 2D slices defining a 3D seismic volume;

generating a plurality of control points for each slice of the subset of slices, wherein the plurality of control points describe a fault visible within the respective slice;

based on the respective plurality of control points, determining a 2D fault curve and respective displacements for the fault within each slice of the subset of slices;

determining a 3D fault surface and a 3D displacement map through the whole volume based on the fault surface and respective displacements determined for each slice of the subset of slices;

for each slice of the larger set of slices not included in the subset of slices, determining a respective 2D fault curve and respective displacements for the fault based on the intersection of the 3D fault surface with the respective slice not included in the subset, wherein the respective displacements of each slice of the larger set of slices not included in the subset of slices are determined based on an intersection of the 3D fault surface and the respective displacements for the slices in the subset of slices of the 3D displacement map;

for each slice of the plurality of slices not included in the subset, determining a displacement map that associates the two sides of the fault curve with respect to the respective slice;

generating a 3D fault displacement map on the computed fault surface; and displaying at least the fault surface within the volume or on a respective slice through the volume.

9. The computer-assisted fault interpretation method of claim 8, wherein the subset of slices comprise about 5% of the larger set of slices.

10. The computer-assisted fault interpretation method of claim 8, wherein the plurality of control points comprise at least fault surface control points.

11. The computer-assisted fault interpretation method of claim 10, wherein the plurality of control points further comprise displacement control points in addition to the fault surface control points.

12. The computer-assisted fault interpretation method of claim 8, further comprising the act of:

refining the fit of the 3D fault surface based on at least the respective fault curves determined for the slices not included in the subset.

13. The computer-assisted fault interpretation method of claim 8, further comprising the act of:

displaying each slice of the subset of slices; and receiving user input from a reviewer providing guidance for the placement of each respective control point associated with a respective slice of the subset.

14. The computer-assisted fault interpretation method of claim 8, further comprising the act of:

receiving an output from a fault detection algorithm providing guidance for the placement of each respective control point associated with a respective slice of the subset.

15. A non-transitory, computer-readable media, encoding one or more processor-executable routines, wherein the routines, when executed by a processor, causes acts to be performed comprising:

receiving as an input a subset of 2D slices taken from a larger set of 2D slices defining a 3D seismic volume;

generating a plurality of control points for each slice of the subset of slices, wherein the plurality of control points describe a fault visible within the respective slice;

based on the control points for each respective slice of the subset, determining a 2D fault curve and associated displacements for the fault in each respective slice of the subset of slices;

determining a 3D fault surface and a 3D displacement map through the whole volume based on the respective fault surfaces and displacements identified in the subset of slices;

for each slice of the larger set of slices not included in the subset, determining a derived 2D fault curve and associated displacements for the fault, wherein the associated displacements are determined based on the intersection of the 3D fault surface and the 3D displacement map;

generating one or more images comprising fault information derived for the seismic volume; and displaying the one or more images comprising fault information derived for the seismic volume.

16. The non-transitory, computer-readable media of claim 15, wherein the plurality of control points comprise at least fault surface control points.

17. The non-transitory, computer-readable media of claim 16, wherein the plurality of control points further comprise displacement control points in addition to the fault surface control points.

18. The non-transitory, computer-readable media of claim 15, wherein the routines, when executed by a processor, causes further acts to be performed comprising:

refining the fit of the 3D fault surface based on at least the derived fault curves determined for the slices not included in the subset.

19. The non-transitory, computer-readable media of claim 15, wherein the routines, when executed by a processor, causes further acts to be performed comprising:
   displaying each slice of the subset of slices; and
   receiving an indication from a reviewer providing guidance for the placement of each respective control point associated with a respective slice of the subset.

20. The non-transitory, computer-readable media of claim 15, wherein the routines, when executed by a processor, causes further acts to be performed comprising:
   receiving an output from a fault detection algorithm providing guidance for the placement of each respective control point associated with a respective slice of the subset.

* * * * *